US012773583B2

(12) United States Patent
Lee et al.

(10) Patent No.: US 12,773,583 B2
(45) Date of Patent: Oct. 27, 2026

(54) SYSTEM FOR PREVENTING VEHICLE FIRE BY OXYGEN DEPRIVIATION

(71) Applicants: Hyundai Motor Company, Seoul (KR); Kia Corporation, Seoul (KR)

(72) Inventors: Tae Hee Lee, Yongin-si (KR); Dae Un Sung, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 162 days.

(21) Appl. No.: 18/613,451

(22) Filed: Mar. 22, 2024

(65) Prior Publication Data

US 2025/0170436 A1 May 29, 2025

(30) Foreign Application Priority Data

Nov. 23, 2023 (KR) ........................ 10-2023-0163903

(51) Int. Cl.
*A62C 2/04* (2006.01)
*A62C 3/07* (2006.01)
*A62C 3/16* (2006.01)
*A62C 37/40* (2006.01)

(52) U.S. Cl.
CPC .................. *A62C 2/04* (2013.01); *A62C 3/07* (2013.01); *A62C 3/16* (2013.01); *A62C 37/40* (2013.01)

(58) Field of Classification Search
CPC .... A62C 2/04; A62C 3/07; A62C 3/16; A62C 37/40; A62C 37/38; A62C 37/36
See application file for complete search history.

(56) References Cited

U.S. PATENT DOCUMENTS

| | | | | |
|---|---|---|---|---|
| 2013/0075116 | A1 | 3/2013 | Lim et al. | |
| 2018/0050230 | A1* | 2/2018 | Toland | A62C 3/16 |
| 2020/0191716 | A1* | 6/2020 | Tanaka | G01N 21/61 |
| 2022/0407174 | A1* | 12/2022 | Sandahl | H01M 50/249 |

FOREIGN PATENT DOCUMENTS

| | | | |
|---|---|---|---|
| CN | 113103872 | A | 7/2021 |
| CN | 113147312 | A | 7/2021 |
| CN | 113577605 | A | 11/2021 |
| CN | 114470560 | A | 5/2022 |
| CN | 114872563 | A | 8/2022 |
| CN | 218793628 | U | 4/2023 |
| CN | 116271626 | A | 6/2023 |
| JP | 2013070992 | A | 4/2013 |

* cited by examiner

*Primary Examiner* — Phutthiwat Wongwian
*Assistant Examiner* — Jacek Lisowski
(74) *Attorney, Agent, or Firm* — Slater Matsil, LLP

(57) ABSTRACT

In an embodiment, a vehicle fire prevention system and a method thereof, capable of preventing vehicle fire by adjusting the amount of oxygen present in an interior space of a vehicle and/or various enclosed parts of the vehicle to become less than a combustion oxygen demand that may cause a combustion reaction, determines the combustion oxygen demand for the interior space and/or the various enclosed parts of the vehicle, detects a current amount of oxygen in the interior space and/or the enclosed parts, and if the current amount of oxygen is greater than the combustion oxygen demand, supplies a gas for discharging the oxygen from the vehicle's interior space and/or the enclosed parts to outside the vehicle.

20 Claims, 6 Drawing Sheets

SYSTEM FOR PREVENTING VEHICLE FIRE BY OXYGEN DEPRIVIATION

CROSS-REFERENCE TO RELATED APPLICATIONS

This application claims the benefit of Korean Patent Application No. 10-2023-0163903, filed on Nov. 23, 2023, which application is hereby incorporated herein by reference.

TECHNICAL FIELD

The present disclosure relates to a vehicle fire prevention system and a method thereof.

BACKGROUND

In general, flammable fuel, various electrical components and wires, and high-voltage batteries are complicatedly mounted in a vehicle, as risk factors for vehicle fire.

For example, because various parts that may cause fire, such as engines, motors, electrical components and wires, are intensively mounted in an engine compartment of the vehicle, fire may occur due to damage to these parts upon vehicle collision.

Particularly, as the use of eco-friendly vehicles such as electric vehicles increases, fire may occur in high-voltage batteries or high-voltage electrical wires due to external shocks, or the like.

In the event of vehicle fire, in a case where a driver and passengers do not escape quickly, casualties may occur due to flames and smoke caused by the fire.

Accordingly, to prevent vehicle fire, techniques of extinguishing vehicle fire by operating a fire extinguisher, in a case where it is determined that fire occurs by detection of combustible gas, flames, smoke, temperature, or the like, have generally been used.

However, because the detection of flames or smoke that occur in the vehicle is performed after the occurrence of vehicle fire, it is difficult to prevent the vehicle fire from expanding, which may result in a total loss of the vehicle and loss of life.

Therefore, there is a need for a technique for extinguishing vehicle fire early or preventing the vehicle fire before spread of fire.

The above information disclosed in this Background section is only for enhancement of understanding of the background of the present disclosure and therefore it may contain information that does not form the prior art that is already publicly known or used.

SUMMARY

The present disclosure relates to a vehicle fire prevention system and a method thereof, and more specifically, to a vehicle fire prevention system and a method thereof capable of preventing vehicle fire by adjusting the amount of oxygen in an interior space of a vehicle or an enclosed part of the vehicle to be less than a combustion oxygen demand that may cause a combustion reaction.

Some embodiments of the present disclosure can solve the above-described problems associated with prior art. An embodiment of the present disclosure can provide a vehicle fire prevention system and a method thereof, capable of preventing vehicle fire by adjusting the amount of oxygen present in an interior space of a vehicle and various enclosed parts of the vehicle to become less than a combustion oxygen demand that may cause a combustion reaction, by determining the combustion oxygen demand for the vehicle's interior space (for example, a passenger compartment, an engine compartment, or the like) or the various enclosed parts of the vehicle, detecting a current amount of oxygen in the vehicle's interior space or the enclosed parts, and supplying, in a case where the current amount of oxygen is greater than the combustion oxygen demand, a gas for discharging the oxygen to the outside into the vehicle's interior space and the enclosed parts.

In an embodiment of the present disclosure, a vehicle fire prevention system includes a gas sensor that detects a current amount of oxygen in an interior space of a vehicle or inside an enclosed part of the vehicle, a fire detector that detects a possibility of fire occurrence of the vehicle, a gas tank that is mounted in the vehicle and is filled with a gas for discharging oxygen present in the vehicle's interior space or inside the enclosed part to the outside, a valve that is mounted to be opened or closed at an outlet of the gas tank, a gas supply line that is connected between the outlet of the valve and the vehicle's interior space or the enclosed part, and a controller that controls opening and closing of the valve on the basis of a detection signal of the gas sensor and a detection signal of the fire detector.

In an embodiment, the vehicle's interior space may be a passenger compartment or an engine compartment, and the enclosed part can be a high-voltage battery or an electrical component.

In an embodiment, the fire detector may be a temperature sensor that detects the temperature of the vehicle's interior space or the enclosed part, or a light intensity sensor that detects a light intensity of the vehicle's interior space or the enclosed part.

In an embodiment, the gas tank may be filled with a gas having a molecular weight greater than that of oxygen, for discharging oxygen present in the vehicle's interior space or inside the enclosed part to the outside.

In an embodiment, the gas tank may be filled with any one of carbon dioxide, an inert gas, an odorous substance gas, and an aromatic substance gas, having a molecular weight greater than that of oxygen, or a mixture of two or more thereof.

In an embodiment, an oxygen discharge hole may be formed in a casing of the enclosed part, through which the oxygen inside the enclosed part can be discharged to the outside when the gas in the gas tank is supplied into the enclosed part.

In an embodiment, a check valve that prevents reverse inflow of external oxygen may be mounted in the oxygen discharge hole.

In an embodiment, the controller may be configured to receive the detection signal from the fire detector, compare the current amount of oxygen detected by the gas sensor with a threshold, selected, set, preset, or predetermined combustion oxygen demand for the vehicle's interior space or the enclosed part, and perform, in a case where the current amount of oxygen is greater than the combustion oxygen demand, control for opening the valve to supply the gas in the gas tank into the vehicle's interior space or the enclosed part.

In an embodiment, the combustion oxygen demand may be selected, set, preset, or predetermined differently depending on the size and a material of the vehicle's interior space, or the size and a material of the enclosed part.

In an embodiment, the vehicle fire prevention system may further include an odor sensor that detects odor in the vehicle's interior space or the enclosed part and transmits a detection signal to the controller.

In an embodiment, the controller may be configured to determine, in a case where an odor concentration indicated by the detection signal from the odor sensor after the gas in the gas tank is supplied into the vehicle's interior space or the enclosed part is less than a reference value, that the current amount of oxygen in the vehicle's interior space or the enclosed part is equal to or greater than a threshold, selected, set, preset, or predetermined combustion oxygen demand for the vehicle's interior space or the enclosed part, and performs control for maintaining an opening state of the valve of the gas tank.

In an embodiment, the controller may be configured to determine, in a case where an odor concentration indicated by the detection signal from the odor sensor after the gas in the gas tank is supplied into the vehicle's interior space or the enclosed part is equal to or greater than a reference value, that the current amount of oxygen in the vehicle's interior space or the enclosed part is less than a threshold, selected, set, preset, or predetermined combustion oxygen demand for the vehicle's interior space or the enclosed part, and perform control for closing the valve of the gas tank.

In an embodiment of the present disclosure, a vehicle fire prevention method includes detecting a current amount of oxygen in an interior space of a vehicle or inside an enclosed part of the vehicle, by a gas sensor, a step of detecting a possibility of fire occurrence of the vehicle, by a fire detector, controlling opening of a valve that is mounted at an outlet of a gas tank on the basis of a detection signal of the gas sensor and a detection signal of the fire detector, by a controller, supplying a gas having a molecular weight greater than that of oxygen, filled in the gas tank, into the vehicle's interior space or the enclosed part, and discharging the oxygen in the vehicle's interior space or the enclosed part to the outside by the gas having the molecular weight greater than that of the oxygen in the vehicle's interior space or inside the enclosed part.

In an embodiment, the detecting of the possibility of fire occurrence of the vehicle by the fire detector may include detecting the temperature of the vehicle's interior space or the enclosed part by a temperature sensor or detecting a light intensity of the vehicle's interior space or the enclosed part by a light intensity sensor.

In an embodiment, the gas having the molecular weight greater than that of oxygen, filled in the gas tank, may be any one of carbon dioxide, an inert gas, an odorous substance gas, and an aromatic substance gas, or a mixture of two or more thereof.

In an embodiment, the controller may be configured to receive the detection signal from the fire detector, compare the current amount of oxygen detected by the gas sensor with a threshold, selected, set, preset, or predetermined combustion oxygen demand for the vehicle's interior space or the enclosed part, and, in a case where the current amount of oxygen is greater than the combustion oxygen demand, perform control for opening the valve to supply the gas having the molecular weight greater than that of the oxygen in the gas tank into the vehicle's interior space or the enclosed part.

In an embodiment, the vehicle fire prevention method may further include detecting odor in the vehicle's interior space or the enclosed part and transmitting a detection signal to the controller.

In an embodiment, the controller may be configured to determine, in a case where an odor concentration indicated by the detection signal from the odor sensor after the gas having the molecular weight greater than that of the oxygen in the gas tank is supplied into the vehicle's interior space or the enclosed part is less than a reference value, that the current amount of oxygen in the vehicle's interior space or the enclosed part is equal to or greater than a threshold, selected, set, preset, or predetermined combustion oxygen demand for the vehicle's interior space or the enclosed part, and perform control for maintaining an opening state of the valve of the gas tank.

In an embodiment, the controller may be configured to determine, in a case where an odor concentration indicated by the detection signal from the odor sensor after the gas having the molecular weight greater than that of the oxygen in the gas tank is supplied into the vehicle's interior space or the enclosed part is equal to or greater than a reference value, that the current amount of oxygen in the vehicle's interior space or the enclosed part is less than a threshold, selected, set, preset, or predetermined combustion oxygen demand for the vehicle's interior space or the enclosed part, and perform control for closing the valve of the gas tank.

It can be understood that the term "vehicle" or other similar terms as used herein can be inclusive of motor vehicles in general, such as passenger automobiles including sport utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle can be a vehicle that has two or more sources of power, for example, vehicles powered by both electricity and gasoline.

BRIEF DESCRIPTION OF THE DRAWINGS

The above and other features of the present disclosure will now be described in detail with reference to certain example embodiments thereof illustrated the accompanying drawings, which are given herein by way of illustration only, and thus are not necessarily limitative of the present disclosure, in which.

Figure 1:
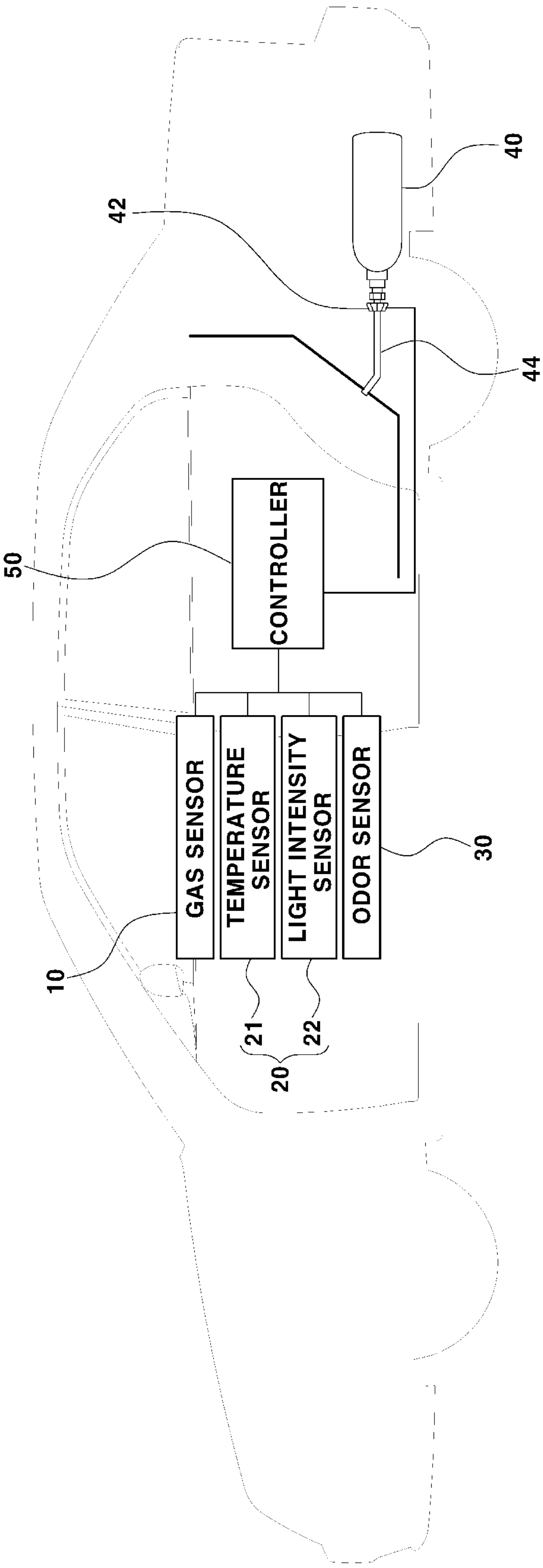
FIG. 1 is a configuration diagram showing a vehicle fire prevention system according to an embodiment of the present disclosure.

It can be understood that the appended drawings are not necessarily to scale, presenting a somewhat simplified representation of various features of some embodiments. Some specific design features of some embodiments of the present disclosure as disclosed herein, including, for example, specific dimensions, orientations, locations, and shapes can be determined in part by the particular intended application and use environment, for example.

In the figures, reference numbers can refer to the same or equivalent parts of the present disclosure throughout the several figures of the drawing.

DETAILED DESCRIPTION OF ILLUSTRATIVE EMBODIMENTS

Hereinafter, reference will be made in detail to various embodiments of the present disclosure, examples of which are illustrated in the accompanying drawings and described below. While the present disclosure will be described in conjunction with example embodiments, it can be understood that the present description is not intended to necessarily limit the disclosure to the example embodiments. On the contrary, the present disclosure is intended to cover not only the example embodiments, but also various alternatives, modifications, equivalents and other embodiments, within the spirit and scope of the disclosure as defined by the appended claims.

In this specification, terms such as "first" and/or "second" may be used to describe various components, but the components are not necessarily limited by such terms. Such terms can be used merely for the purpose of distinguishing one component from other component. For example, a first component may be referred to as a second component, similarly, the second component may also be referred to as the first component.

Three factors are known that can be main causes of vehicle fire: an ignition source, a combustible material, and oxygen.

Ignition source can refer to heat (temperature), sparks, and flames necessary for combustion. The size of an ignition source can be determined by physical characteristics such as an ignition point and a flash point of a combustible material. Combustible material can refer to a material that may cause a combustion reaction with oxygen, and may include plastic, gasoline, diesel oil, lubricating oil, and the like, for example.

Oxygen is necessary for a combustion reaction for ignition of the combustible material, and a combustion oxygen demand that may cause the combustion reaction may be determined depending on the physical and chemical properties of the combustible material.

In a case where a current amount of oxygen present in an enclosed part of a vehicle containing combustible material is less than the combustion oxygen demand, the combustion reaction does not occur even in a case where the ignition source is created in the combustible material, and the combustion reaction may eventually disappear naturally as long as oxygen is not continuously supplied into the enclosed part of the vehicle. Accordingly, vehicle fire may be prevented by adjusting the amount of oxygen in an interior space of a vehicle and inside an enclosed part of the vehicle to be less than the combustion oxygen demand.

Specifically, a gas effusion law indicating that the rate of gas effusion is inversely proportional to the square root of its molecular weight under a constant temperature and pressure is already well known as Graham's law, which states that a gas of a lighter molecule effuses faster than a gas of a heavier molecule to the outside in a certain space. On the basis of Graham's law, an embodiment of the present disclosure can be designed to supply a gas having a molecular weight greater than that of oxygen (for example, carbon dioxide, an inert gas used for fire suppression, or the like) into an interior space of a vehicle and an enclosed part of the vehicle such as a high-voltage battery to discharge oxygen in the vehicle's interior space and the enclosed part to the outside and adjust the amount of oxygen present in the vehicle's interior space and the enclosed part to be less than the combustion oxygen demand, thereby preventing vehicle fire in advance.

Figure 2:
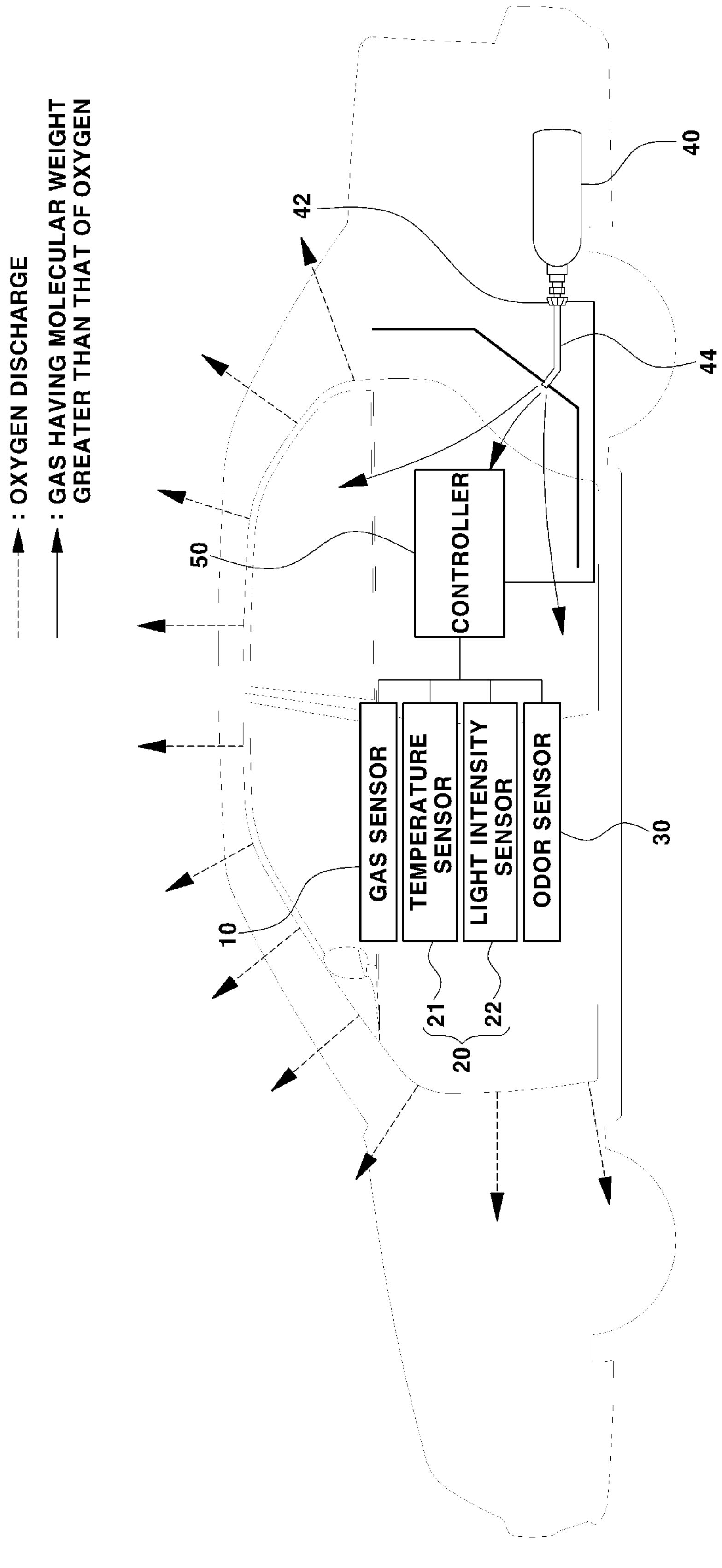
FIG. 2 is a schematic diagram showing an operating state of the vehicle fire prevention system according to an embodiment of the present disclosure.

FIG. 1 is a configuration diagram showing a vehicle fire prevention system according to an embodiment of the present disclosure. FIG. 2 is a schematic diagram showing an operating state of the vehicle fire prevention system according to an embodiment of the present disclosure.

The vehicle fire prevention system according to an embodiment of the present disclosure includes a gas sensor 10 that detects a current amount of oxygen in an interior space of a vehicle, a fire detector 20 that detects a possibility of fire occurrence in the vehicle's interior space, and a gas tank 40 that is mounted in the vehicle and is filled with a gas for discharging oxygen present in the vehicle's interior space.

The vehicle's interior space may be a passenger compartment or an engine compartment, for example, and the gas sensor 10 may be an oxygen sensor that measures the amount of oxygen present in the vehicle's interior space.

As the fire detector 20, a temperature sensor 21 that detects the temperature of the vehicle's interior space and/or a light intensity sensor 22 that detects a light intensity of the vehicle's interior space may be used. The temperature sensor 21 and the light intensity sensor 22 may be used together.

The temperature sensor 21 may measure whether a current temperature of the vehicle's interior space is equal to or higher than a preset reference temperature at which there is a high possibility of fire, and the light sensor 22 may detect sparks or flames of a certain size that momentarily occur in the vehicle's interior space.

The gas tank 40 can be filled with a gas having a molecular weight greater than that of oxygen, for discharging oxygen present in the vehicle's interior space to the outside of the vehicle's interior space or outside the vehicle.

The gas having the molecular weight greater than that of oxygen, in the gas tank 40, may be one of carbon dioxide, an inert gas, an odorous substance gas, and an aromatic substance gas, or a mixture of two or more thereof, for example.

For example, the gas tank 40 may be filled with any one of carbon dioxide and an inert gas as the gas having the molecular weight greater than that of oxygen, a mixture of carbon dioxide and an odorous substance gas or an aromatic substance gas, or a mixture of an inert gas and an odorous substance gas or an aromatic substance gas.

To supply the gas having a molecular weight greater than that of oxygen, filled in the gas tank 40, to the vehicle's interior space, an electric valve 42 can be mounted to be opened or closed at an outlet of the gas tank 40, and a gas supply line 44 can be connected between the outlet of the valve 42 and the vehicle's interior space.

The opening and closing of the valve 42 can be controlled by a controller 50. The controller 50 can be configured to perform control for opening or closing the valve 42 based on a detection signal of the current amount of oxygen from the gas sensor 10 and/or a detection signal of the possibility of fire occurrence from the fire detector 20.

The controller 50 can be configured to receive the detection signal of the possibility of fire occurrence from the fire detector 20, compare the current amount of oxygen detected by the gas sensor 10 with a threshold, selected, set, preset, or predetermined combustion oxygen demand for the vehicle's interior space, and perform, in a case where the current amount of oxygen is greater than the combustion oxygen demand, control for opening of the valve 42.

The detection signal of the possibility of fire occurrence may be a signal indicating that the current temperature of the vehicle's interior space measured by the temperature sensor 21 is equal to or higher than a preset reference temperature at which there is a high possibility of fire occurrence, or may be a signal indicating that momentary sparks or flames of a certain size that occur in the vehicle's interior space are detected by the light intensity sensor 22. The combustion oxygen demand may be determined through experiments in advance depending on sizes and materials of interior spaces for respective vehicle types, and may be stored in a memory unit for the controller 50.

As the valve 42 is opened under the control of the controller 50, the gas having the molecular weight greater than that of oxygen in the gas tank 40 may be supplied into the vehicle's interior space through the gas supply line 44.

Accordingly, in a case where the gas having the molecular weight greater than that of oxygen is supplied into the vehicle's interior space, such as the passenger compartment and the engine compartment, the oxygen present in the vehicle's interior space can be effused to the outside, for example, through gaps of doors according to Graham's law as mentioned above, as shown in FIG. 2 for example. As a result, the amount of oxygen present in the vehicle's interior space may be adjusted to become less than the combustion oxygen demand.

By adjusting the amount of oxygen present in the vehicle's interior space to be less than the combustion oxygen demand before actual vehicle fire occurs in a state where there is a high possibility of fire occurrence in the vehicle's interior space, it is possible to extinguish the vehicle fire early or prevent the vehicle fire.

The vehicle fire prevention system according to an embodiment of the present disclosure may further include an odor sensor 30 that detects odor in the vehicle's interior space and transmits a detection signal (e.g., odor detection signal) to the controller 50.

Accordingly, after the gas having the molecular weight greater than that of oxygen in the gas tank 40 (for example, a mixture of carbon dioxide and an odorous substance gas or an aromatic substance gas, or a mixture of an inert gas and an odorous substance gas or an aromatic substance gas) is supplied into the vehicle's interior space, in a case where an odor concentration indicated by the detection signal received from the odor sensor 30 is less than a reference value, the controller 50 can determine that the current amount of oxygen in the vehicle's interior space is equal to or greater than the threshold, selected, set, preset, or predetermined combustion oxygen demand, and can perform control for maintaining an opening state of the valve 42 of the gas tank 40.

On the other hand, after the gas having the molecular weight greater than that of oxygen in the gas tank 40 (for example, a mixture of carbon dioxide and an odorous substance gas or an aromatic substance gas, or a mixture of an inert gas and an odorous substance gas or an aromatic substance gas) is supplied into the vehicle's interior space, in a case where the odor concentration indicated by the detection signal received from the odor sensor 30 is equal to or greater than the reference value (e.g., a reference odor value), the controller 50 can determine that the current amount of oxygen in the vehicle's interior space is less than the threshold, selected, set, preset, or predetermined combustion oxygen demand, and can perform control for closing the valve 42 of the gas tank 40.

The controller 50 may be configured to perform the control for closing the valve 42 and simultaneously operate a visual and/or audible alarm device mounted in the vehicle.

In an embodiment, it is possible to determine whether the current amount of oxygen present in the vehicle's interior space is equal to or greater than or less than the preset combustion oxygen demand in the vehicle's interior space using the odor sensor, and as the current oxygen level in the vehicle's interior space is adjusted to be less than the combustion oxygen demand, it is possible for passengers or bystanders outside the vehicle to confirm that there is no risk of fire through alarm from the alarm device, for example.

Figure 3:
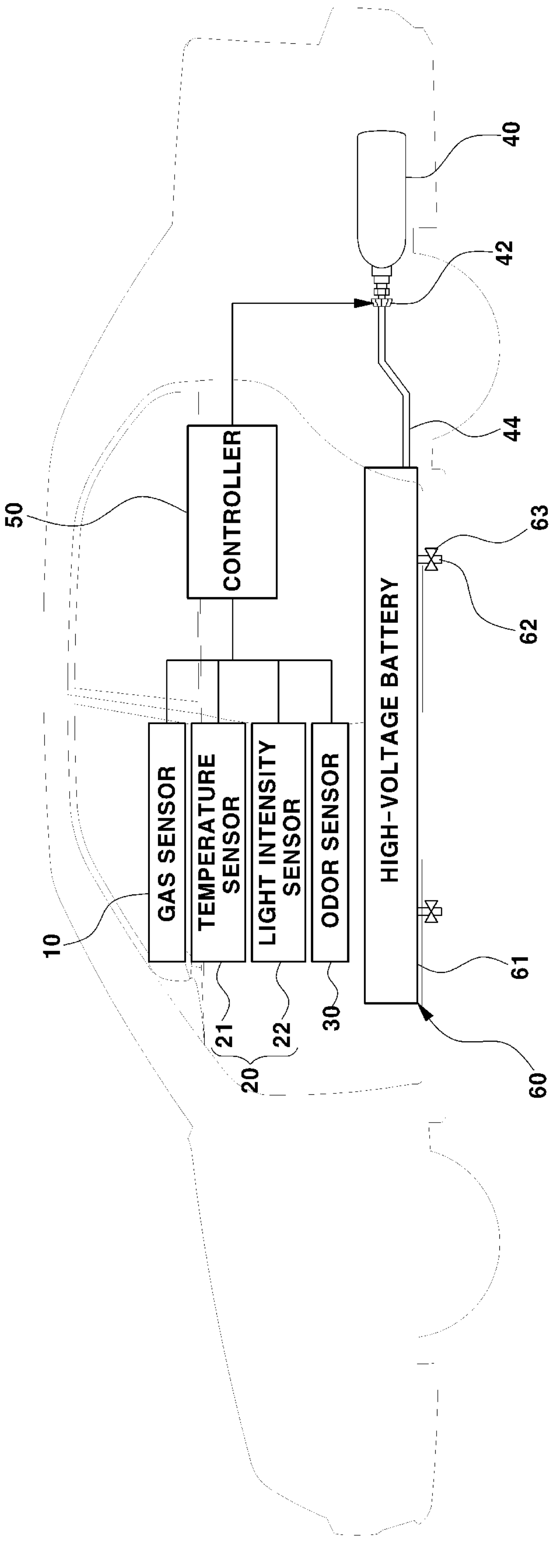
FIG. 3 is a configuration diagram showing a vehicle fire prevention system according to an embodiment of the present disclosure.
Figure 4:
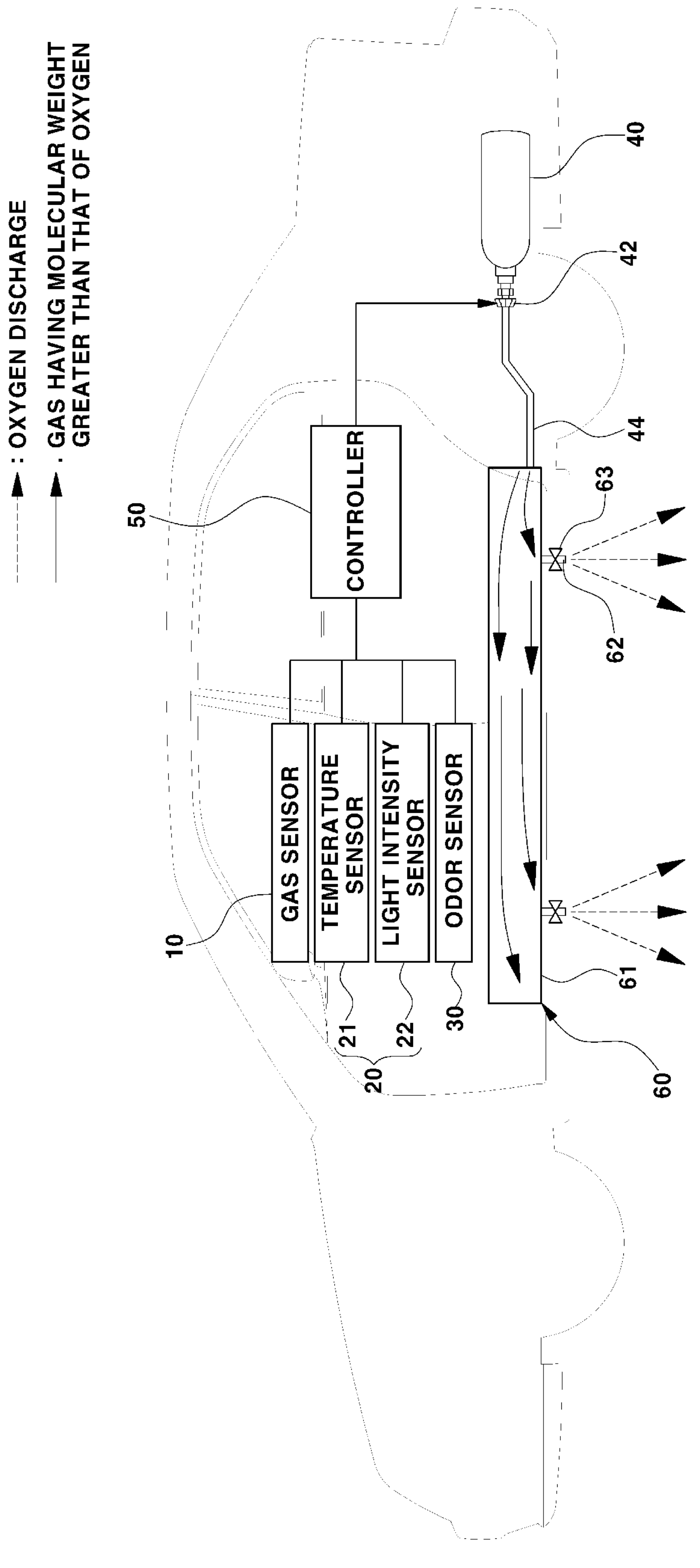
FIG. 4 is a schematic diagram showing an operating state of the vehicle fire prevention system according to an embodiment of the present disclosure.

FIG. 3 is a configuration diagram showing a vehicle fire prevention system according to an embodiment of the present disclosure. FIG. 4 is a schematic diagram showing an operating state of the vehicle fire prevention system according to an embodiment of the present disclosure.

The vehicle fire prevention system according to an embodiment can include a gas sensor 10 that detects a current amount of oxygen inside an enclosed part 60 of a vehicle, a fire detector 20 that detects the possibility of fire occurrence in the enclosed part 60, and a gas tank 40 that is mounted in the vehicle and is filled with a gas for discharging oxygen present inside the enclosed part 60 to the outside.

The enclosed part 60 may be a high-voltage battery or a variety of electrical components, as a part whose internal space is enclosed by a casing 61, for example, and the gas sensor 10 may be an oxygen sensor that measures the amount of oxygen present in the enclosed part 60.

An oxygen discharge hole 62 can be formed in the casing 61 of the enclosed part 60, through which the oxygen inside the enclosed part 60 can be discharged to the outside when the gas with which the gas tank 40 is filled is supplied to the enclosed part 60.

A check valve 63 that prevents reverse inflow of external oxygen and discharges internal oxygen to the outside can be provided in the oxygen discharge hole 62.

For example, as shown in FIGS. 3 and 4, in the case of a high-voltage battery as an example of the enclosed part 60, mounted in the vehicle, because oxygen that promotes combustion in the case of fire occurrence can be present inside the high-voltage battery, to discharge the oxygen from the inside of the casing of the high-voltage battery to the outside, the oxygen discharge hole 62 may be formed in the casing of the high-voltage battery, and the check valve 63 may be provided in the oxygen discharge hole 62.

As the fire detector 20, either a temperature sensor 21 that detects the temperature of the enclosed part 60 or a light intensity sensor 22 that detects the light intensity of the enclosed part 60 may be used, or the temperature sensor 21 and the light intensity sensor 22 may be used together.

The temperature sensor 21 may measure whether a current temperature of the enclosed part 60 is equal to or higher than a preset reference temperature at which there is a high possibility of fire, and the light sensor 22 may detect sparks or flames of a certain size that momentarily occur in the enclosed part 60.

The gas tank 40 can be filled with a gas having a molecular weight greater than that of oxygen, for discharging oxygen present in the enclosed part 60 to the outside.

The gas having the molecular weight greater than that of oxygen, filled in the gas tank 40, may be one of carbon dioxide, an inert gas, an odorous substance gas, and an aromatic substance gas, or a mixture of two or more thereof, for example.

For example, the gas tank 40 may be filled with any one of carbon dioxide and an inert gas as the gas having the molecular weight greater than that of oxygen, a mixture of carbon dioxide and an odorous substance gas or an aromatic substance gas, or a mixture of an inert gas and an odorous substance gas or an aromatic substance gas.

In addition, to supply the gas with the molecular weight greater than that of the oxygen filled in the gas tank 40 into the enclosed part 60, an electric valve 42 can be mounted to be opened or closed at an outlet of the gas tank 40, and a gas supply line 44 can be connected between the outlet of the valve 42 and the gas supply line 44.

The opening and closing of the valve 42 can be controlled by a controller 50. The controller 50 can be configured to perform control for opening or closing the valve 42 based on a detection signal of the current amount of oxygen from the gas sensor 10 and/or a detection signal of the possibility of fire occurrence from the fire detector 20.

The controller 50 can be configured to receive the detection signal of the possibility of fire occurrence from the fire detector 20, can compare the current amount of oxygen detected by the gas sensor 10 with a threshold, selected, set, preset, or predetermined combustion oxygen demand for the enclosed part 60, and can perform, in a case where the current amount of oxygen is greater than the combustion oxygen demand, control for opening the valve 42.

The detection signal of the possibility of fire occurrence may be a signal indicating that the current temperature of the enclosed part 60 measured by the temperature sensor 21 is equal to or higher than the preset reference temperature at which there is a high possibility of fire occurrence, or may be a signal indicating that momentary sparks or flames of a certain size that occur in the enclosed part 60 are detected by the light intensity sensor 22. The combustion oxygen demand may be determined through experiments in advance depending on sizes and materials of the enclosed part 60, and may be stored in a memory unit for the controller 50.

As the valve 42 is opened under the control of the controller 50, the gas having the molecular weight greater than that of oxygen in the gas tank 40 may be supplied into the enclosed part 60 through the gas supply line 44.

Accordingly, in a case where the gas having the molecular weight greater than that of oxygen is supplied into the enclosed part 60, the oxygen present in the enclosed part 60 such as a high-voltage battery may be discharged to the outside through the oxygen discharge hole 62 formed in a casing 61 of the enclosed part 60, or may be discharged to the outside through the check valve 63 mounted in the oxygen discharge hole 62, according to Graham's law as mentioned above, as shown in FIG. 4 for example. As a result, the amount of oxygen present in the enclosed part 60 may be adjusted to become less than the combustion oxygen demand.

In an embodiment, by adjusting the amount of oxygen present in the enclosed part 60 to be less than the combustion oxygen demand before actual vehicle fire occurs in a state where there is a high possibility of fire occurrence in the enclosed part 60, it is possible to extinguish the vehicle fire early or prevent the vehicle fire, for example.

The vehicle fire prevention system according to an embodiment may further include an odor sensor 30 that detects odor in the vehicle's interior space and transmits a detection signal to the controller 50.

Accordingly, after the gas having the molecular weight greater than that of oxygen in the gas tank 40 (for example, a mixture of carbon dioxide and an odorous substance gas or an aromatic substance gas, or a mixture of an inert gas and an odorous substance gas or an aromatic substance gas) is supplied into the enclosed part 60, in a case where an odor concentration indicated by the detection signal received from the odor sensor 30 is less than a reference value, the controller 50 can determine that the current amount of oxygen in the enclosed part 60 is equal to or greater than the predetermined combustion oxygen demand, and can perform control for maintaining an opening state of the valve 42 mounted at the outlet of the gas tank 40.

On the other hand, after the gas having the molecular weight greater than that of oxygen in the gas tank 40 (for example, a mixture of carbon dioxide and an odorous substance gas or an aromatic substance gas, or a mixture of an inert gas and an odorous substance gas or an aromatic substance gas) is supplied into the enclosed part 60, in a case where the odor concentration indicated by the detection signal received from the odor sensor 30 is equal to or greater than the reference value, the controller 50 can determine that the current amount of oxygen in the enclosed part 60 is less than the threshold, selected, set, preset, or predetermined combustion oxygen demand, and can perform control for closing the valve 42 mounted at the outlet of the gas tank 40.

The controller 50 may be configured to perform the control for closing the valve 42 and simultaneously operate a visual and/or audible alarm device mounted in the vehicle.

In an embodiment, it is possible to determine whether the current amount of oxygen present in the enclosed part 60 is equal to or greater than or less than the preset combustion oxygen demand in the enclosed part 60 using the odor sensor, and as the current oxygen level in the vehicle's interior space is adjusted to be less than the combustion oxygen demand, it is possible for passengers or bystanders outside the vehicle to confirm that there is no risk of fire through alarm from the alarm device, for example.

Hereinafter, a vehicle fire prevention method according to an embodiment of the present disclosure, based on the configuration of either, both, each, or any combination of the above-described embodiments, will be described.

Figure 5:
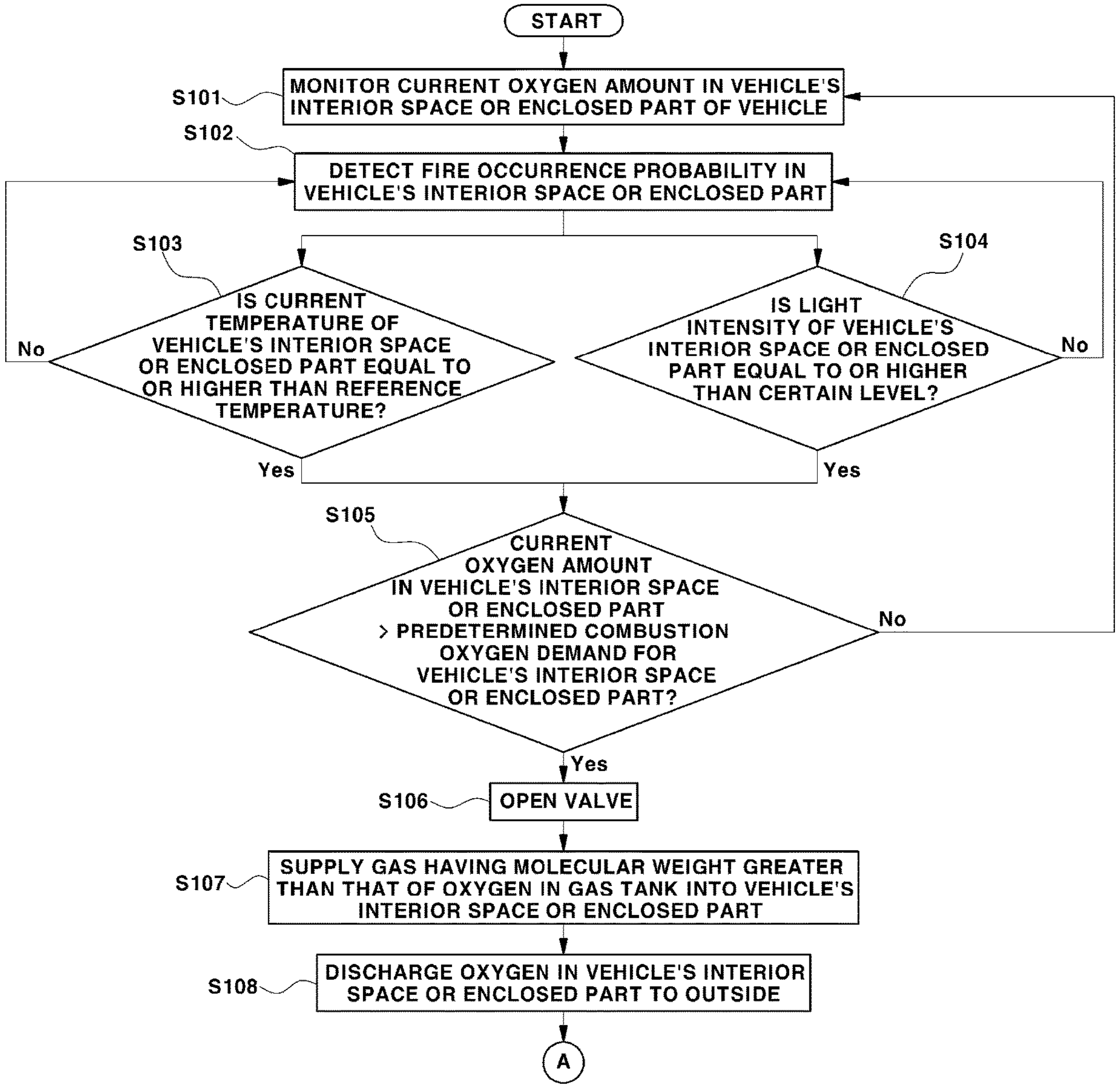
FIGS. 5 and 6 are flowcharts showing a vehicle fire prevention method according to an embodiment of the present disclosure.
Figure 6:
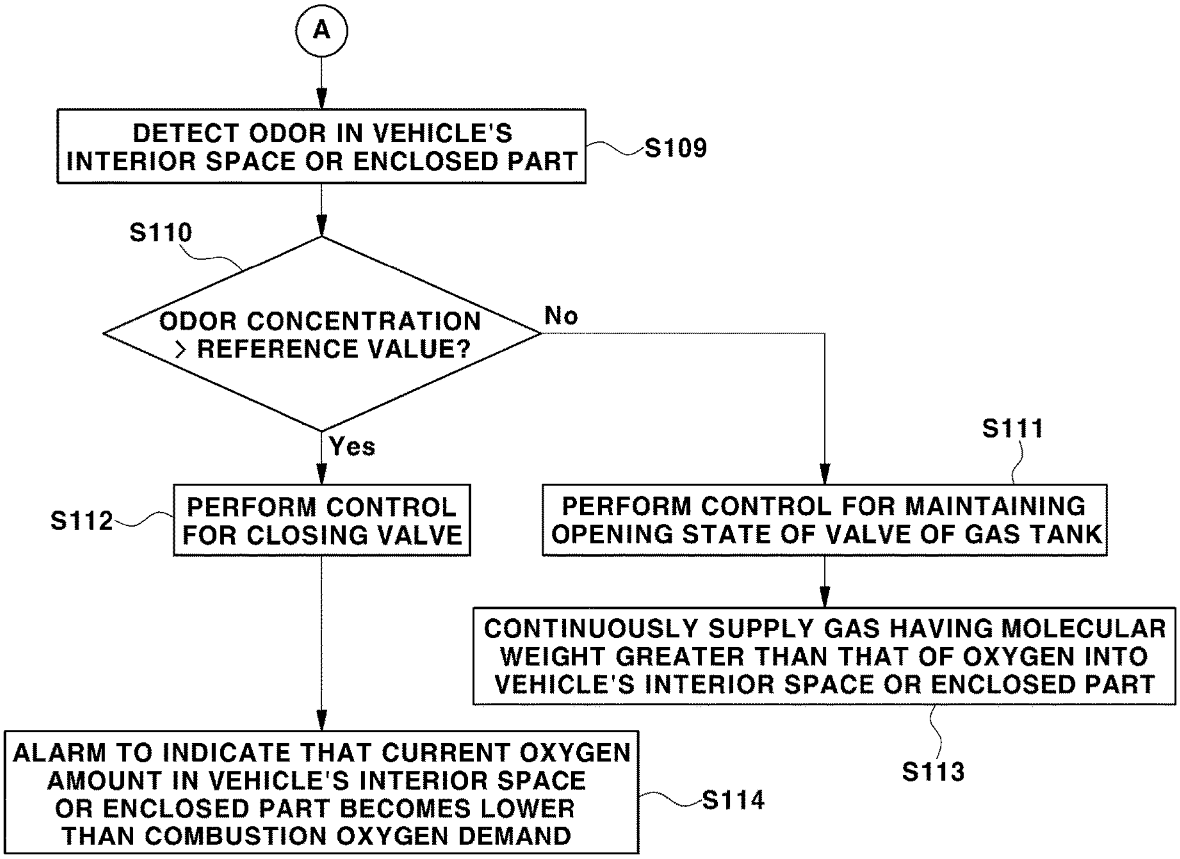

FIGS. 5 and 6 are flowcharts showing a vehicle fire prevention method according to an embodiment of the present disclosure.

First, a current amount of oxygen in an interior space of a vehicle or inside an enclosed part 60 of the vehicle can be detected (operation S101).

The current amount of oxygen in the vehicle's interior space or the enclosed part 60 may be detected by a gas sensor 10 mounted in the vehicle's interior space or the enclosed part 60.

The possibility of fire occurrence in the vehicle's interior space or the enclosed part 60 can be detected (operation S102).

The possibility of fire occurrence in the vehicle's interior space or the enclosed part 60 may be detected by a fire detector 20.

For example, detecting the possibility of fire occurrence of the vehicle may include detecting the temperature of the vehicle's interior space or the enclosed part 60 by a temperature sensor 21, which is an example of the fire detector 20, and/or detecting a light intensity of the vehicle's interior space or the enclosed part 60 by a light intensity sensor 22, which is another example of the fire detector 20.

Then, it is determined whether the current temperature of the vehicle's interior space or the enclosed part 60 is equal to or higher than a reference temperature (operation S103), and/or whether the light intensity of the vehicle's interior space or the enclosed part 60 is equal to or higher than a certain level (operation S104).

For example, in a case where the controller 50 receives the detection signal from the temperature sensor 21, indicating that the current temperature of the vehicle's interior space or the enclosed part 60 is equal to or higher than a threshold, preset, selected, or predetermined reference temperature at which there is a high possibility of fire, the controller 50 may determine that there is a fire possibility of the vehicle's interior space or the enclosed part 60.

Alternatively or additionally, in a case where the controller 50 receives the detection signal from the light sensor 22, indicating that sparks or flames of a certain size occur from the vehicle's interior space or the enclosed part 60, the controller 50 may determine that there is a fire possibility of the vehicle's interior space or the enclosed part 60.

In a case where the current temperature of the vehicle's interior space or the enclosed part 60 is equal to or higher than the reference temperature, and/or the light intensity of the vehicle's interior space or the enclosed part 60 is equal to or higher than the certain level, the controller 50 can compare the current amount of oxygen in the vehicle's interior space or the enclosed part 60 with a threshold, selected, set, preset, or predetermined combustion oxygen demand for the vehicle's interior space or the enclosed part 60 (operation S105).

As a result of the comparison, in a case where the current amount of oxygen is greater than the combustion oxygen demand, the valve can be opened under the control of the controller to supply the gas having the molecular weight greater than that of oxygen in the gas tank into the vehicle's interior space or the enclosed part 60 (operation S106).

Accordingly, the gas having the molecular weight greater than that of oxygen filled in the gas tank 40 can be supplied into the vehicle's interior space or the enclosed part 60 through the gas supply line 44 (operation S107).

Accordingly, the oxygen in the vehicle's interior space or the enclosed part 60 may be discharged to the outside by the gas having the molecular weight greater than that of oxygen supplied into the vehicle's interior space or the enclosed part 60 (operation S108).

Specifically, in a case where the gas having the molecular weight greater than that of oxygen is supplied into the vehicle's interior space or the enclosed part 60, the oxygen present in the vehicle's interior space may be effused to the outside, for example, through gaps of doors according to Graham's law as mentioned above, as shown in FIGS. 2 and 4, or the oxygen present in the enclosed part 60 of the vehicle may be effused to the outside of the casing of the enclosed part 60, and thus, with an embodiment, it is possible to adjust the amount of oxygen present in the vehicle's interior space or the enclosed part 60 to become less than the combustion oxygen demand.

By adjusting the amount of oxygen present in the vehicle's interior space or the enclosed part 60 to be less than the combustion oxygen demand before actual vehicle fire occurs in a state where there is a high possibility of fire occurrence in the vehicle's interior space, with an embodiment, it is possible to extinguish the vehicle fire early or prevent the vehicle fire.

After the gas having the molecular weight greater than that of oxygen in the gas tank 40 is supplied into the vehicle's interior space or the enclosed part 60, detecting odor in the vehicle's interior space or the enclosed part 60 may be further performed (operation S109).

After the gas having the molecular weight greater than that of oxygen in the gas tank 40 is supplied into the vehicle's interior space or the enclosed part 60, detecting odor in the vehicle's interior space or the enclosed part 60 by the odor sensor 30 and transmitting a detection signal to the controller 50 may be performed.

In a case where a mixture of carbon dioxide and an odorous substance gas or an aromatic substance gas, or a mixture of an inert gas and an odorous substance gas or an aromatic substance gas is supplied into the vehicle's interior space or the enclosed part 60 as the gas having the molecular weight greater than that of oxygen, the odor detection may be performed by the odor sensor 30.

Subsequently, the controller 50 can compare an odor concentration detected by the odor sensor 30 with a reference value (operation Silo).

As a result of the comparison, in a case where the odor concentration detected by the odor sensor 30 is less than a reference value, the controller 50 can perform control for maintaining an opening state of the valve 42 of the gas tank 40 (operation Sill).

Specifically, in a case where the odor concentration indicated by the detection signal from the odor sensor 30 after the gas having the molecular weight greater than that of oxygen in the gas tank 40 is supplied into the vehicle's interior space or the enclosed part 60 is less than the reference value, the controller 50 can determine that the current amount of oxygen in the vehicle's interior space or the enclosed part 60 is equal to or greater than the threshold, selected, set, preset, or predetermined combustion oxygen demand for the vehicle's interior space or the enclosed part 60, and can perform control for keeping the opening state of the valve 42 of the gas tank 40.

Accordingly, the gas having the molecular weight greater than that of oxygen in the gas tank 40 may be continuously supplied into the vehicle's interior space or the enclosed part 60 until the current amount of oxygen in the vehicle's interior space or the enclosed part 60 becomes less than the predetermined combustion oxygen demand (operation S113).

On the other hand, in a case where the odor concentration detected by the odor sensor is equal to or higher than the reference value, the controller 50 may perform control for closing the valve 42 (operation S112).

Specifically, in a case where the odor concentration indicated by the detection signal from the odor sensor 30 after the gas having the molecular weight greater than that of oxygen in the gas tank 40 is supplied into the vehicle's interior space or the enclosed part 60 is equal to or higher than the reference value, the controller 50 can determine that the current amount of oxygen in the vehicle's interior space or the enclosed part 60 is less than the threshold, selected, set, preset, or predetermined combustion oxygen demand for the vehicle's interior space or the enclosed part 60, and can perform control for closing the valve 42 of the gas tank 40.

In addition, in a case where the current amount of oxygen in the vehicle's interior space or the enclosed part 60 becomes less than the combustion oxygen demand, an alarm can be sent to indicate that the current amount of oxygen in the vehicle's interior space or the enclosed part 60 has become less than the combustion oxygen demand (operation S114).

In a case where the current amount of oxygen in the vehicle's interior space or the enclosed part 60 becomes less than the combustion oxygen demand, the controller 50 can perform control for closing the valve 42, and at the same time, for operating a visual and audible alarm device mounted in the vehicle.

Using an embodiment, it is possible to determine whether the current amount of oxygen present in the enclosed part 6*o* is equal to or greater than or less than the preset combustion oxygen demand using the odor sensor 30, and as the current oxygen level in the vehicle's interior space is adjusted to be less than the combustion oxygen demand, it is possible for passengers or bystanders outside the vehicle to confirm that there is no risk of fire through alarm from the alarm device, for example.

Accordingly, some embodiments of the present disclosure provide the following advantages.

First, with an embodiment, in a case where the possibility of vehicle fire is detected, by supplying a gas having a molecular weight greater than that of oxygen (for example, carbon dioxide, an inert gas used for fire suppression) into a vehicle's interior space such as a passenger compartment and an engine compartment and an enclosed part of the vehicle such as a high-voltage battery to discharge oxygen in the vehicle's interior space and the enclosed part to the outside, it is possible to prevent vehicle fire in advance.

Second, with an embodiment, by adjusting the amount of oxygen present in the vehicle's interior space and the enclosed part to become less than the combustion oxygen demand, it is possible to extinguish vehicle fire early or prevent the vehicle fire.

Third, a fire prevention system according to an embodiment of the present disclosure may be applied not only to vehicles, but also to future transport such as PBVs (Purpose Built Vehicles) and UAM (Urban Air Mobility) aircraft, robots, and ignition hazard parts used in various industrial fields, to thereby make it possible to prevent fire risk, for example.

The present disclosure has been described in detail with reference to some embodiments thereof. However, it can be appreciated by those skilled in the art that changes may be made in these embodiments without departing from the principles and spirit of the present disclosure, the scope of which can be defined in the appended claims and their equivalents.

What is claimed is:

1. A vehicle fire prevention system comprising:

a gas sensor configured to detect a current amount of oxygen in an interior space of a vehicle;

a fire detector configured to detect a possibility of fire occurrence of the vehicle;

a gas tank mounted in the vehicle and filled with a gas configured to discharge the oxygen present in the interior space to an outside of the vehicle;

a valve connected to an outlet of the gas tank and configured open or close the outlet of the gas tank;

a gas supply line connected between the outlet of the gas tank and the interior space; and a controller configured to control opening and closing of the valve based on a detection signal of the gas sensor and a detection signal of the fire detector.

2. The system of claim 1, wherein the interior space of the vehicle includes a passenger compartment or an engine compartment.

3. The system of claim 1, wherein the fire detector includes a temperature sensor configured to detect a temperature of the interior space.

4. The system of claim 1, wherein the fire detector includes a light intensity sensor configured to detect a light intensity of the interior space.

5. The system of claim 1, wherein the gas has a molecular weight greater than that of the oxygen.

6. The system of claim 1, wherein the gas includes one of or any combination of carbon dioxide, an inert gas, an odorous substance gas, or an aromatic substance gas, and wherein the gas has a molecular weight greater than that of the oxygen.

7. The system of claim 1, further comprising a casing of an enclosed part having an oxygen discharge hole configured to enable the oxygen inside the enclosed part to be discharged through the oxygen discharge hole to the outside of the vehicle in response to the gas being supplied into the enclosed part.

8. The system of claim 7, further comprising a check valve configured to prevent reverse inflow of external oxygen, the check valve being mounted in the oxygen discharge hole.

9. The system of claim 1, wherein the controller is configured to:

receive the detection signal from the fire detector, compare the current amount of the oxygen detected by the gas sensor with a threshold combustion oxygen demand for the interior space, and in response to the current amount of oxygen being greater than the threshold combustion oxygen demand, control the opening of the valve to supply the gas into the interior space.

10. The system of claim 9, wherein the threshold combustion oxygen demand is set based on a size and a material content of the interior space of the vehicle.

11. The system of claim 1, further comprising an odor sensor configured to:

detect odor in the interior space, and transmit an odor detection signal to the controller.

12. The system of claim 11, wherein the controller is configured to:

determine, when an odor concentration indicated by the odor detection signal from the odor sensor after the gas is supplied into the interior space is less than a reference odor value, that the current amount of the oxygen in the interior space is equal to or greater than a threshold combustion oxygen demand for the interior space, and perform control to maintain an opening state of the valve.

13. The system of claim 11, wherein the controller is configured to:

determine, when an odor concentration indicated by the odor detection signal from the odor sensor after the gas is supplied into the interior space is equal to or greater than a reference odor value, that the current amount of the oxygen in the interior space is less than a threshold combustion oxygen demand for the interior space, and perform control for the closing the valve.

14. A vehicle fire prevention system comprising:

a gas sensor configured to detect a current amount of oxygen in an interior space of a vehicle;

a fire detector configured to detect a possibility of fire occurrence of the vehicle;

a gas tank mounted in the vehicle and filled with a gas configured to discharge the oxygen present in the interior space to an outside of the vehicle;

a valve connected to an outlet of the gas tank and configured to open or close the outlet of the gas tank;

a gas supply line connected between the outlet of the gas tank and the interior space; and a controller configured to control opening and closing of the valve based on a detection signal of the gas sensor and a detection signal of the fire detector so that a vehicle fire is prevented by adjusting the current amount of oxygen in the interior space of the vehicle to less than a combustion oxygen demand.

15. A vehicle fire prevention system comprising:

a gas sensor configured to detect a current oxygen concentration in an interior space of a vehicle;

a fire detector configured to detect a possibility of fire occurrence of the vehicle;

a gas tank mounted in the vehicle and filled with a gas configured to discharge oxygen present in the interior space to an outside of the vehicle;

a valve connected to an outlet of the gas tank and configured to open or close the outlet of the gas tank;

a gas supply line connected between the outlet of the gas tank and the interior space; and a controller configured to control opening and closing of the valve based on the current oxygen concentration detected by the gas sensor and a detection signal of the fire detector.

16. The system of claim 15, wherein the interior space of the vehicle includes a passenger compartment or an engine compartment.

17. The system of claim 15, wherein the fire detector includes a temperature sensor configured to detect a temperature of the interior space.

18. The system of claim 15, wherein the fire detector includes a light intensity sensor configured to detect a light intensity of the interior space.

19. The system of claim 15, wherein the gas has a molecular weight greater than that of the oxygen.

20. The system of claim 15, wherein the gas includes one of or any combination of carbon dioxide, an inert gas, an odorous substance gas, or an aromatic substance gas, and wherein the gas has a molecular weight greater than that of the oxygen.

* * * * *